Feb. 13, 1923.

J. NELSON

TRAP

Filed Jan. 15, 1921

1,445,543

Jens Nelson, INVENTOR

BY Victor J. Evans, ATTORNEY

WITNESS: J. W. Ely

Patented Feb. 13, 1923.

1,445,543

UNITED STATES PATENT OFFICE.

JENS NELSON, OF NEW YORK, N. Y.

TRAP.

Application filed January 15, 1921. Serial No. 437,448.

*To all whom it may concern:*

Be it known that I, JENS NELSON, a citizen of the United States, residing at New York, in the county of New York and State of New York, have invented new and useful Improvements in Traps, of which the following is a specification.

This invention relates to traps.

More particularly the invention relates to traps for trapping and exterminating insects such as flies, roaches, waterbugs, and the like.

Some of the objects of the present invention are: to produce a trap of the character mentioned which embodies readily separable members to facilitate the removal of exterminated insects; to produce a device which is comparatively simple of construction; to produce an inexpensive trap. With those mentioned and other objects in view the invention resides in the particular construction and the relative arrangement of parts hereinafter more fully described and illustrated in the accompanying drawing, in which.

Figure 1:
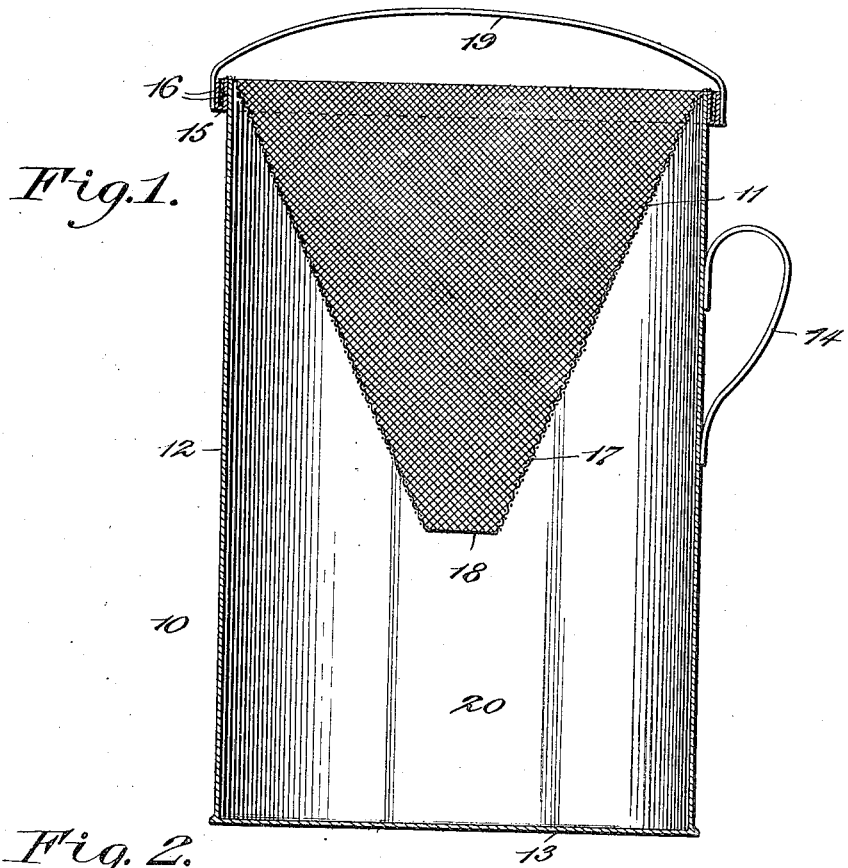
Figure 1 is a central vertical sectional view of the trap of the present invention.
Figure 2:
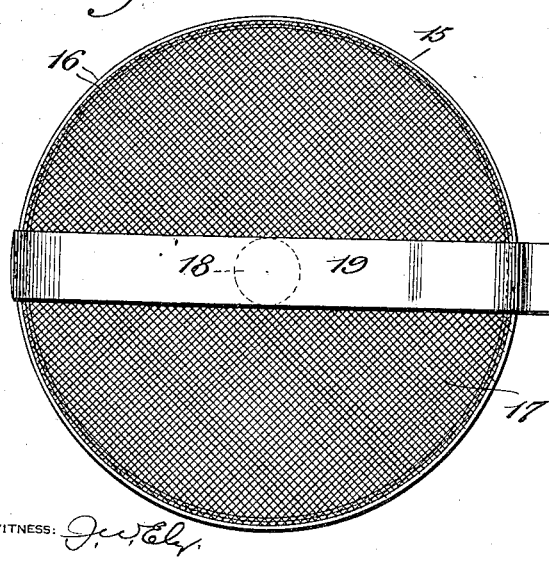
Figure 2 is a top plan view.
Figure 3:
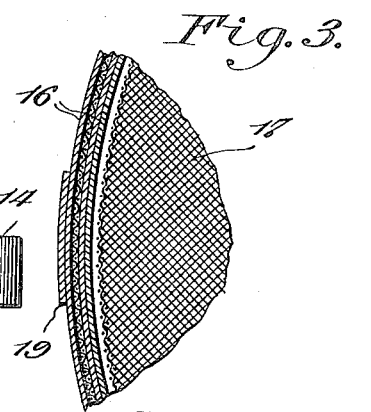
Figure 3 is a detail sectional fragmentary view.

Referring now more particularly to the drawing for details, it will be manifest that, the trap of the present invention consists principally of two main members 10 and 11. The member 10 consists of a preferably cylindrical part 12 which is open at its top, and which has a bottom 13, and a handle 14. The member 11 consists of a fitting 15, which embodies spaced annular rings or parts 16. The member 11 also consists of a part 17 of foraminated material formed into the shape of a cone, and so as to provide an entrance opening 18. The larger end of the part 17 is bent and extended into the space between the rings 16, and is securely soldered or otherwise attached to the said rings. A handle 19 is secured to the rings 16 and serves as a means for the ready separation of the members 10 and 11.

In the assemblage of the members 10 and 11 the fitting 15 encircles the upper end of the part 12. A portion of the part 17 limits the extent to which the fitting 15 may be moved down about the part 12, as will be understood. The part 17 extends downwardly in the compartment 20 which is defined by the walls of the part 12. It is into the compartment 20 that the insects find their way through the opening 18 in the part 17.

Suitable bait to attract the insects is placed on the bottom of the member 10. The insertion of the bait is readily permitted by separating the members 10 and 11. Likewise, by separating the said members the trap may be cleaned from time to time, and the exterminated insects may be removed as the occasion arises.

What is claimed is:

1. A trap comprising a member having a handle, and open at its top, and defining a compartment; a second member including a fitting having spaced parts, and a foraminated part having a return bend and an opening, the return bend of said foraminated part being secured to the parts of said fitting, and a handle secured to said fitting.

2. A trap comprising separable members, one of said members having bottom and side walls to define a compartment; the other of said members comprising a fitting, a foraminated part having walls converging to a relatively small opening, and a return bend, the said return bend of said foraminated part being secured to said fitting, and a handle secured to said fitting.

In testimony whereof I hereby affix my signature.

JENS NELSON.